D. WEIR.
CHUCK.
APPLICATION FILED DEC. 1, 1915.
1,225,089.
Patented May 8, 1917.
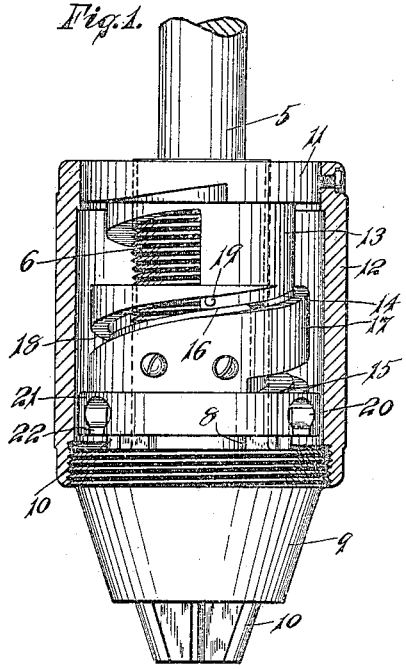
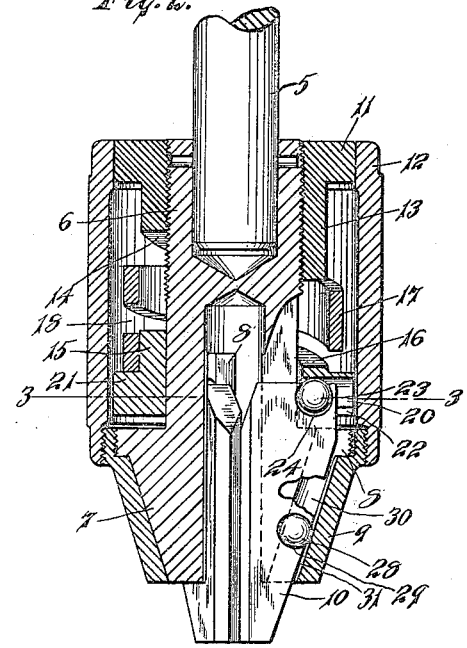
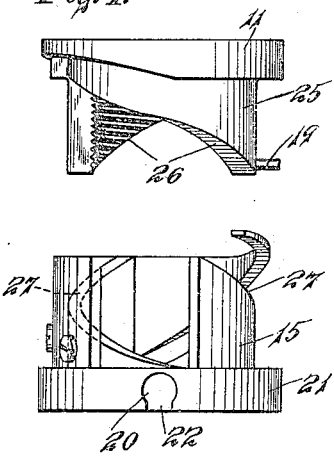
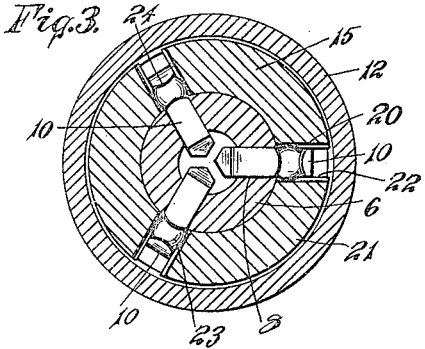
WITNESSES:
INVENTOR.
David Weir,
BY Arthur B. Jenkins,
ATTORNEY.

UNITED STATES PATENT OFFICE.

DAVID WEIR, OF HARTFORD, CONNECTICUT.

CHUCK.

1,225,089.  Specification of Letters Patent.  Patented May 8, 1917.

Application filed December 1, 1915. Serial No. 64,559.

*To all whom it may concern:*

Be it known that I, DAVID WEIR, a citizen of the United States, residing at Hartford, in the county of Hartford and State of Connecticut, have invented a new and Improved Chuck, of which the following is a specification.

My invention relates more especially to that class of devices employed for holding the cutting tool in a lathe or drill, and an object of my invention, among others, is to provide a chuck that will rapidly clamp or release the tool and that will effectively hold it for cutting operation.

One form of chuck embodying my invention and in the construction and use of which the objects herein set out as well as others may be attained is illustrated in the accompanying drawings, in which—

Figure 1 is a view in elevation of a chuck embodying my invention with the sleeve cut in central longitudinal section.

Fig. 2 is a view in central longitudinal section through a chuck embodying my invention.

Fig. 3 is a view in cross section on plane denoted by dotted line 3—3 of Fig. 2.

Fig. 4 is a detail view of parts of the chuck embodying a slightly different form of construction.

While my invention is not limited in its application to any particular form of chuck, as it is readily adapted to that form of chuck known as drill chuck, I have selected such for the purpose of illustration and description herein.

In the accompanying drawings the numeral 5 indicates the lower end of a drill spindle and 6 a chuck body having a recess within which the spindle is frictionally received in a manner common to devices of this class.

A head 7 is formed at the lower end of the chuck body and is provided with jaw slots 8 and a sleeve 9 that fits the tapered outer surface of the head close to the slots. Chuck jaws 10 are located within the slots 8 and operate against the tapered inner surface of the sleeves 9 in their closing movement, in a manner common to devices of this kind.

A plate 11 has a central opening, screw threaded to fit the screw threaded upper end of the chuck body 6, said plate being located within and secured to the upper end of the actuating sleeve 12, the lower end of which sleeve is secured to the tapered sleeve 9 by interengaging screw threads. A cam neck 13 projects downwardly from the inner surface of the plate 11, surrounding the upper end of the chuck body and having a carrier operating cam 14 at its lower edge.

A carrier 15 is mounted to slide upon the chuck body, as shown in Fig. 2 of the drawings, the upper end of the carrier having a cam 16 shaped to coöperate with the cam 14, the engagement of the latter with the former moving the carrier downwardly upon the chuck body. A cam sleeve 17 is secured to the carrier, projecting upwardly beyond the cam 16 in position to surround the cam neck 13, this cam sleeve having a cam groove 18 to receive a lifting pin 19 projecting from the side of the neck 13. Recesses 20 are formed radially in a flange 21 at the lower end of the carrier, and slots 22 open from the recesses to the lower surface of the flange, there being a recess for each jaw. A ball 23 is fitted in a ball recess 24 in the upper end of each chuck jaw, said ball being received within the recess 20. The chuck jaws 10 and the slots 22 are narrower than the diameters of the balls 23 so that the latter serve to connect the jaws with the carrier and each serves as an antifriction member to facilitate radial movement of the jaws in the carrier. The free and easy movement of the parts is further aided by means of balls 28 located in openings 29 in the back edges of the jaws, said balls being of a diameter to project on opposite sides of the jaws and into recesses comprising grooves 30 extending laterally from jaw grooves 31 in the tapered sleeve 9. The openings 29 extend through the back edges of the jaws so that the balls 28 operate upon the bottoms of the grooves 31. This construction retains the lower ends of the jaws in their proper positions and the freedom of movement of the parts is aided.

From the above description it will be noted that rotation of the sleeve 12 will move it upwardly to a slight degree on the thread on the tapered sleeve 9, such operation taking place with the jaws in their open position. This operation also rotates the cam neck 13, the latter moving upwardly on the thread at the upper end of the chuck body, said thread and those upon the tapered sleeve being formed to permit this movement. As the neck 13 is thus rotated its cam acting upon the cam 16 on the carrier causes the latter to be moved downwardly, carrying the balls in the chuck jaws against the tapered inner surfaces of the grooves in the sleeve 9 that forces the jaws radially inward, the balls 23 moving freely within the recesses 20. A reverse movement of the sleeve 12 causes the pin 19 to act against the upper surface of the cam groove 18 lifting the carrier, and releasing the chuck jaws. The construction shown in Fig. 4 is similar to that described, with the exception that the cam neck 25 has two cams 26 instead of the single type shown in Figs. 1 to 3, and the carrier 15 has two cam surfaces 27, this causing a greater (twice as much) movement of the carrier in a certain movement of the sleeve of the construction shown in Figs. 1 to 3.

The construction herein shown enables the full movement of the jaws to take place with a minimum amount of movement of the sleeve as compared with prior devices, it being possible to close the jaws from their open position in a single turn of the sleeve, and the threaded connection between the sleeve and the chuck body at the top and bottom securely locks the jaws in their closed position. These threads have little pitch and either one will be sufficient to lock the jaws against opening movement.

While I have shown and described herein a satisfactory construction of parts for carrying out my ideas, this may be departed from to a greater or lesser degree and yet be within the spirit and intent of the invention as defined by the scope of the appended claims.

I claim—

1. A chuck body, a carrier slidably mounted on the chuck body, a carrier actuator rotatably mounted on the chuck body and having a steep pitched cam to operate the carrier, jaws attached to the carrier, a member to receive the thrust of the jaws and means independent of said cam to prevent rotation of said actuator on the chuck body by reason of thrust upon said cam.

2. A chuck body, a carrier slidably mounted on the chuck body and having a cam at its end, a carrier actuator rotatably mounted on the chuck body and having a cam at its end to coöperate with that on the carrier, an operating sleeve rigidly connected with the actuator, jaws attached to the carrier and a member to receive the thrust of the jaws.

3. A chuck body, a carrier slidably mounted on the chuck body and having a cam at its end, a carrier actuator rotatably mounted on the chuck body and having a cam at its end to coöperate with that on the carrier, jaws attached to the carrier, and a member to receive the thrust of the jaws.

4. A chuck body, a carrier slidably mounted on the chuck body and having a jaw closing and a jaw opening cam, a carrier actuator rotatably mounted on the chuck body and having a cam at its end to coöperate with the jaw closing cam on the carrier, and also having means to coöperate with the jaw opening cam on the carrier, an operating sleeve rigidly connected with the actuator, jaws attached to the carrier and a member to receive the thrust of the jaws.

5. A chuck body, a carrier slidably mounted on the chuck body with a cam formation at its upper end said carrier also having a cam slot, a carrier actuator rotatably mounted on the chuck body above said carrier and having a cam formation on its lower end to coöperate with the cam formation on the carrier, said actuator having a pin to engage the slot on the carrier, an operating sleeve rigidly connected with the actuator, jaws attached to the carrier, and a member to receive the thrust of the jaws.

6. A chuck body, a carrier of tubular form slidably mounted on the chuck body and having a cam formation at its end, a cam sleeve rising above said cam formation and having a cam slot, a carrier actuator rotatably mounted upon said body and having a cam at its lower end to coöperate with that upon the carrier and a projection to engage said slot, an operating sleeve rigidly connected with the actuator, jaws attached to the carrier, and a member to receive the thrust of the jaws.

7. A chuck body, a carrier slidably mounted upon the chuck body and having a cam at its upper end, a carrier actuator rotatably mounted on the chuck body and having a cam at its lower end to coöperate with that on the carrier, a cam sleeve secured to the carrier and projecting above it and surrounding said actuator and having a cam slot, a projection from said actuator entering the slot, an operating sleeve rigidly connected with the actuator and inclosing the parts above mentioned, jaws attached to the carrier, and a member to receive the thrust of the jaws.

8. A chuck body, a carrier sleeve slidably mounted on the chuck body, a carrier actuator rotatably mounted on the chuck body and having a projection, a cam sleeve fitted to said carrier and projecting above it and surrounding said actuator and having a slot to receive said projection, said actuator and carrier having coöperating cams on their adjacent ends, an operating sleeve rigidly connected with said actuator and inclosing the parts above mentioned, jaws attached to the carrier, and a member to receive the thrust of the jaws.

9. A chuck including a carrier having a recess therein, a chuck jaw having an opening, a ball rotatably mounted in said recess and opening to connect the jaw to the carrier, means for operating the carrier and a member to take the thrust of the jaw.

10. A chuck including a member having a recess therein with a slot opening out of said recess, a chuck jaw extending into said slot and having an opening, and a ball located in said opening and projecting on opposite sides of said jaw into said recess.

11. A chuck including a carrier having a recess therein with a slot opening out of said recess, means for operating the carrier, a chuck jaw located in said slot and having an opening to register with said recess, a ball located in said opening and projecting on opposite sides of said jaw into said recess, and a member to receive the thrust of the jaw.

12. A chuck including a member having a recess therein with a slot opening out of said recess, a chuck jaw extending into said slot and having an opening extending through the back edge of the jaw, and a ball located in said opening and extending into said recess and projecting beyond the back edge of the jaw.

13. A chuck including a carrier having a recess therein with a slot opening out of said recess, means for operating the carrier, a member to receive the thrust of jaws, said member having recesses therein with slots extending into said recesses, chuck jaws extending into said slots and having openings to register with said recesses, and balls located in said openings and projecting thereoutof into said recesses.

14. A chuck body, a carrier slidably mounted on the chuck body, a slidably mounted carrier actuator having a threaded connection with the chuck body and a cam to operate the carrier, a sleeve rigidly connected with the actuator, jaws attached to the carrier, and a member to receive the thrust of the jaws.

15. A chuck body, a carrier slidably mounted on the chuck body, a rotatably mounted carrier actuator having a threaded connection with the chuck body, said carrier and carrier actuator having cams on their adjacent ends for operation of the carrier, a sleeve rigidly connected with the actuator, jaws attached to the carrier, and a member to receive the thrust of the jaws.

DAVID WEIR.

Witnesses:
E. F. EATON,
LOUIS LUCIA.

Copies of this patent may be obtained for five cents each, by addressing the "Commissioner of Patents, Washington, D. C."